United States Patent

Schiller et al.

[11] Patent Number: 5,972,245
[45] Date of Patent: Oct. 26, 1999

[54] BASIC LAYERED LATTICE COMPOUNDS

[75] Inventors: Michael Schiller, Arnoldstein; Hartmut Hensel, Viktring; Heinz Krivanec, Vienna; karoline Pacher, Liebenfels; Paul Ebner, Arnoldstein; Klaus Dolleschal, Villach; Emil Lattacher, Arnoldstein; Christina Summerer, Villach, all of Austria

[73] Assignee: Chemson Polymer-Additive Gesellschaft m.b.H., Arnoldstein, Austria

[21] Appl. No.: 08/692,839

[22] PCT Filed: Jan. 31, 1995

[86] PCT No.: PCT/EP95/00340

§ 371 Date: Oct. 2, 1996

§ 102(e) Date: Oct. 2, 1996

[87] PCT Pub. No.: WO95/21127

PCT Pub. Date: Aug. 10, 1995

[30] Foreign Application Priority Data

| Feb. 3, 1994 | [AT] | Austria | 203/94 |
| Feb. 3, 1994 | [AT] | Austria | 204/94 |
| Nov. 8, 1994 | [DE] | Germany | 44 39 934 |

[51] Int. Cl.$^6$ .............. C09K 15/32; C08K 5/098
[52] U.S. Cl. ............ 252/397; 252/400.24; 252/400.52; 252/400.53; 252/400.54; 252/400.61; 524/398; 524/399; 524/400
[58] Field of Search .............. 252/397, 400.24, 252/400.54, 400.61, 400.52, 400.53; 524/398, 399, 400

[56] References Cited

U.S. PATENT DOCUMENTS 5,569,694  10/1996  Kuhm et al. .............. 524/399

FOREIGN PATENT DOCUMENTS 9411431  5/1994  WIPO.

*Primary Examiner*—Shean C. Wu
*Attorney, Agent, or Firm*—Mayer, Brown & Platt

[57] ABSTRACT

The invention concerns basic layered lattice compounds of the general formula (I) $Me^{III}_a Me^{II}_b (Me^{IV})_c (OH)_d O_e A^{n-}_f \times mH_2O$, a process for producing the same and the use thereof in a halogen-containing resin composition having improved thermal stability, initial coloring and improved color fastness.

66 Claims, No Drawings

BASIC LAYERED LATTICE COMPOUNDS

This application is made pursuant to 35 U.S.C. § 371 of international application number PCT/EP95/00340, filed Jan. 31, 1995.

The invention relates to basic layered lattice compounds, a process for preparing the same and their use in a halogenated resin composition having improved thermal stability, initial colouring and improved colour fastness.

When performing a melt deformation a halogen-containing thermoplastic resin such as polyvinyl chloride (PVC) transforms into a polyene structure, hydrochloric acid being eliminated and the polymer darkening in colour. In order to improve the thermal stability of the polymer it is common practice to incorporate metal carboxylates into the resin as stabilizers. However, as the incorporation of stabilizers alone with a prolonged melt deformation process may result in a so-called metal combustion causing blackening of the polymer, the addition of a co-stabilizer such as polyols (such as pentaerythritol), organic phosphorous acid esters (such as triphenylphosphite), epoxy compounds (such as epoxidized soy oil) or the like represents common practice.

As basic lead salts as well as other heavy metal-containing stabilizers are rated toxic there are attempts to find alternatives for stabilizing. A multitude of combinations of inorganic and organic compounds as stabilizers for halogen-containing polymers is known. DE-3 019 632 and EP-189 899 suggest hydrotalcites as stabilizers. With regard to thermal stability and transparency these compounds are superior to mixtures of Ca/Zn-metal carboxylates. Using hydrotalcites, however, the discoloration problem of the polymer during processing cannot be solved. According to EP-63 180 the use of combinations of hydrotalcites and 1,3-diketo compounds is suggested as a solution to this problem.

DE-3 941 902 and DE-4 106 411 and DE-4 002 988 and DE-4 106 404, respectively, as well as DE-4 103 881 suggest basic calcium-aluminium-hydroxy-phosphites and basic calcium-aluminium-hydroxy-carboxylates, respectively, as well as hydrocalumites as stabilizers for halogen-containing polymers, especially PVC. Regarding thermal stability and transparency these compounds are inferior to mixtures containing hydrotalcites. Furthermore, the use of such compounds containing water of hydration can give rise to problems with the processing of the halogen-containing resin due to the elimination of the water of crystallization; cf. M. Meyn "Doppelhydroxide und Hydroxidoppelsalze—Synthese, Eigenschaften und Anionenaustauschverhalten" [Double hydroxides and hydroxide double salts—Synthesis, properties and anion exchange performance], Thesis, Kiel 1991. EP-A-0 256 872 suggests the addition of super-finely divided magnesium oxide in order to overcome this drawback.

DE-4 103 916 and DE-4 106 403 are claiming basic hydroxy compounds of di and trivalent metal ions which are defined as "not being of the hydrotalcite type", among other things, as PVC stabilizers. Regarding thermal stability and transparency these compounds are also inferior to mixtures containing hydrotalcites. Furthermore, by using such compounds which contain water of hydration problems with the processing of the halogen-containing resin due to the elimination of water of crystallization may arise herewith as well.

DE-4 238 567 claims garnets with mono, di, tri and tetravalent metal ions having a spatial network structure similar to grossular as PVC stabilizers. Regarding thermal stability and transparency these compounds are also inferior to mixtures containing hydrotalcites. Furthermore, garnets are effective as abrasives. As is known, garnets are used in the art as abrasives for optical lenses and for sandblasting.

The problem underlying the invention is the provision of novel compounds as well as a process for preparing the same which are particularly suited as stabilizers for halogen-containing polymers without showing the above-mentioned drawbacks of the known stabilizers, especially being rated non-toxic.

According to the invention this problem is solved by the provision of basic layered lattice compounds of general formula (I):

$$Me^{III}{}_a Me^{II}{}_b (Me^{IV})_c (OH)_d O_e A^n{}_f \cdot m H_2 O \qquad (I)$$

wherein $Me^{II}$ represents a divalent metal selected from the group consisting of magnesium, calcium, barium, strontium, zinc, lead$^{II}$, cadmium or a mixture thereof;

$Me^{III}$ represents a trivalent metal selected from the group consisting of aluminium, bismuth, antimony, titanium$^{III}$, iron$^{III}$ or a mixture thereof;

$Me^{IV}$ represents a tetravalent metal selected from the group consisting of titanium$^{IV}$, tin, zirconium or a mixture thereof or $Me^{IV}O$ wherein $Me^{IV}$ has the meaning given above;

$A^n$ represents an anion having a valency n and being selected from the group consisting of sulphate, sulphite, sulphide, thiosulphate, hydrogen sulphate, hydrogen sulphite, hydrogen sulphide, peroxide, peroxosulphate, carbonate, hydrogen carbonate, nitrate, nitrite, phosphate, pyrophosphate, phosphite, pyrophosphite, hydrogen phosphate, hydrogen phosphite, dihydrogen phosphate, dihydrogen phosphite, halide, pseudohalide, halite, halate, perhalate, $I_3^-$, permanganate, amide, azide, hydroxide, hydroxylamine, hydrazide, acetylacetonate, an anion of an organic carboxylic acid having one or more carboxylic acid groups, an anion of mono- or polyvalent phenols or a mixture thereof;

is wherein $a/b = 1:1$ to $1:10$; $2 \leq b \leq 10$; $0 < c < 5$; $0 \leq e$; $0 \leq m < 5$ and d, e and f are chosen such that a basic charge-free molecule results.

Among those preferred ones are basic layered lattice compounds wherein the ratio a/b is in the range from 1:1 to 1:9.

Especially preferred are basic layered lattice compounds of the general formula (I) stated above, wherein $Me^{II}$, $Me^{III}$ and $A^n$ are of the meaning given above and $Me^{IV}$ is $Me^{IV}O$, wherein $Me^{IV}$ is a tetravalent metal selected from the group consisting of titanium$^{IV}$, tin, zirconium or a mixture thereof and $a/b = 1:1$ to $1:10$; $2 \leq b \leq 10$; $0 < c < 5$; $0 < d$; $0 \leq e$; $0 \leq m < 5$ and d, e and f are chosen such that a basic charge-free molecule results.

Among those last-named basic layered lattice compounds those ones wherein the ratio a/b is in the range of 2:4 to 2:6 are very especially preferred.

Also especially preferred are basic layered lattice compounds of general formula (II):

$$Me^{II}{}_a (Me^{II}{}_b Me^{IV}{}_{(1-b/2)})_{(1-a)} (OH)_2 A^n{}_{a/n} \cdot m H_2 O \qquad (II)$$

wherein $Me^{II}$, $Me^{III}$ and $A^n$ are of the meanings given above and $Me^{IV}$ represents a tetravalent metal selected from the group consisting of titanium$^{IV}$, tin, zirconium or a mixture thereof and $0.05 < a < 0.5$, $0 < b < 1$ and $0 \leq m < 2$.

Further especially preferred are basic layered lattice compounds of general formula (III):

$$Me^{II}{}_a(Me^{III}{}_bMe^{IV}{}_{(1-b/2)})_{(1-a)}(OH)_cA^{n-}{}_d \times mH_2O \qquad (III)$$

wherein $Me^{II}$, $Me^{III}$ and $A^n$ are of the meanings given above and $Me^{IV}$ represents a tetravalent metal selected from the group consisting of titanium$^{IV}$, tin, zirconium or a mixture thereof and $0.05<a<0.5$, $0<b<1$ and $0\leq m<2$ and $c+d=2+a$, with $c=2$ being excepted.

Surprisingly it has been shown that the basic layered lattice compounds according to the invention impart a higher thermal stability to the halogen-containing thermoplastic resins and the articles made thereof compared to the halogen-containing thermoplastic resins and the articles made thereof which do not contain the compounds according to the invention. The compounds according to the invention prevent any discoloration occurring during the manufacture of rigid PVC extrudates, for example. Colour fastness as well as weatherability of test samples stabilized by compounds according to the invention are superior to those of test samples not containing any compounds according to the invention.

Also subject of the invention is a process for the production of the basic layered lattice compounds according to the invention characterized by reacting $Me^{II}$ as a hydroxide, oxide or a mixture thereof, $Me^{III}$ as a hydroxide, further as a mixed salt wit NaOH, as well as $Me^{IV}$ as a hydroxide, oxy salt, oxide or mixtures thereof with an appropriate acid, a salt of the appropriate acid or mixtures thereof wherein the anion of the acid has the meaning given above in an aqueous medium at a pH value of 8 to 12 at temperatures from 20 to 250° C. and separating and recovering the reaction product in a manner known per se.

The reaction product directly resulting from the reaction described above may be separated from the aqueous reaction medium according to known procedures, preferably by filtration. Work-up of the separated reaction product is also accomplished in a manner known per se, for example, by washing the filter cake with water and drying the washed residue at temperatures from 60–150° C., for example, preferably at 90–120° C.

In the case of aluminium finely divided active metal(III) hydroxide in combination with sodium hydroxide as well as $NaAlO_2$ may be employed for the reaction. Metal(II) may be used in the form of a finely divided metal(II) oxide or hydroxide or mixtures thereof. Metal(IV) may be used in the form of finely divided and/or dissolved metal(IV) oxide, hydroxide or oxy salts or mixtures thereof. The corresponding acid anions may be employed in variably concentrated forms, e.g., directly as an acid or as a salt, for example, as an alkaline salt.

Reaction temperatures are between about 20–250° C., preferably in particular between about 60 and 180° C. Neither catalysts nor accelerators are required. Water of crystallization of the compounds according to the invention may be eliminated completely or partially by thermal treatment.

When applied as stabilizers the dried compounds according to the invention which are free of water of hydration do not eliminate any water or another gas at conventional rigid PVC processing temperatures from 160–200° C. so as not to occur any interfering formation of bubbles.

In order to improve their dispersibility in halogen-containing thermoplastic resins the compounds according to the invention may be coated with surface-active agents in a manner known per se.

The present invention will be described in further detail below.

Examples of the halogen-containing thermoplastic resin to be used according to the invention are PVC, polyvinylidene chloride, chlorinated or chlorosulphonated polyethylene, chlorinated polypropylene or chlorinated ethylene/vinyl acetate copolymer. Resins of the PVC type, i.e. vinyl chloride homopolymers and copolymers of vinyl chloride and other monomers, are especially favourable.

With regard to the above-mentioned general formula (I) of the basic layered lattice compounds it is considered that Mg, Ca, $Sn^{2+}$ and Zn are preferred representatives for $Me^{II}$, Al, $Bi^{3+}$, $Sb^{3+}$ and $Ti^{3+}$, Al being preferred among them, and $Ti^{4+}$, $Sn^{4+}$ and $Zr^{4+}$ are preferred representatives for $Me^{IV}$.

The anion of general formula $A^{n-}$ can be sulphate, sulphite, sulphide, thiosulphate, peroxide, peroxosulphate, hydrogen phosphate, hydrogen phosphite, carbonate, halide, nitrate, nitrite, hydrogen sulphate, hydrogen carbonate, hydrogen sulphite, hydrogen sulphide, dihydrogen phosphate, dihydrogen phosphite, an anion of a monocarboxylic acid such as acetate and benzoate, amide, azide, hydroxide, hydroxylamide, hydrazide, acetylacetonate, phenolate, pseudohalide, halite, halate, perhalate, $I_3^-$, permanganate, a dianion of a dicarboxylic acid such as phthalate, oxalate, maleate or fumarate, bisphenolate, phosphate, pyrophosphate, phosphite, pyrophosphite, a trianion of a tricarboxylic acid such as citrate, trisphenolate and another anion of an organic carboxylic acid having one or more carboxylic acid groups, an anion of a monovalent or polyvalent phenol or a mixture thereof. Among those hydroxide, carbonate, phosphite, maleate, fumarate and phthalate are preferred.

The basic layered lattice compounds according to the invention may be surface-treated with a higher fatty acid, e.g. stearic acid, an anionic surface-active agent, a silane coupling agent, a titanate coupling agent, a glycerol fatty acid ester or the like in order to improve the dispersibility in the halogen-containing thermoplastic resin.

In order to enhance the stabilizing effect of the basic layered lattice compounds according to the invention there may be additionally added metal carboxylates [Compound (A)] as additives to the halogen-containing thermoplastic resins. Examples of metal carboxylates which can be used according to the invention are, for example, salts of higher fatty acids, naphthenic acid or the like, of metals of group II of the Periodic Table of Elements. Examples of suitable metals of group II are magnesium, calcium, strontium, barium, zinc, lead, cadmium or the like. Especially favourable are salts of higher fatty acids such as stearic, palmitic, myristic, lauric, ricinolic acid or the like. Zinc salts are especially efficient with regard to colour fastness. According to the invention it is therefore preferred that a zinc salt of a higher fatty acid is added. Although the above-mentioned metal carboxylates can be used alone an even higher stabilizing effect can be attained with the use of a combination of two or more of them.

Although the addition of the basic layered lattice compounds of the invention to the halogen-containing thermoplastic resins is already effective in achieving the desired improvements, enhanced effects can be attained when one or more known stabilizers for halogen-containing polymers are additionally used alone or in combination with compound (A). Thus, the combination with at least one compound (B), which is selected from the group of 1,3-diketo compounds, organic esters of phosphorous acid, polyols and amino acid derivates can lead to a significant improvement of the initial colouring.

Examples of the aforementioned 1,3-diketo compounds are among others dibenzoylmethane, stearoylbenzoylmethane, palmitoylbenzoylmethane, myristoylbenzoylmethane, lauroylbenzoylmethane, benzoylacetone, acetylacetone, tribenzoylmethane, diacetylacetobenzene, p-methoxystearoylacetophenone, acetoacetate and acetylacetone.

Examples of the aforementioned esters of phosphorous acid are among others triarylphosphites such as triphenylphosphite, tris(p-nonylphenyl)phosphite or the like, alkylarylphosphites such as monoalkyldiphenylphosphite, e.g. diphenylisooctylphosphite, diphenylisodecylphosphite or the like and dialkylmonophenylphosphites such as phenyldiisooctylphosphite, phenyldiisodecylphosphite or the like and trialkylphosphites such as triisooctylphosphite, tristearylphosphite or the like.

Examples of the aforementioned polyols are trismethylolpropane, its di(trismethylolpropane), erythritol, pentaerythritol, dipentaerythritol, sorbitol, mannitol or the like.

Examples of the aforementioned amino acid derivatives are among others glycine, alanine, lysine, tryptophan, acetylmethionine, pyrrolidonecarboxylic acid, β-aminocrotonic acid, α-aminoacrylic acid, α-aminoadipic acid or the like as well as the corresponding esters. The alcohol components of these esters comprise among others monovalent alcohols such as methyl alcohol, ethyl alcohol, propyl alcohol, isopropyl alcohol, butyl alcohol, α-ethylhexanol, octyl alcohol, isooctyl alcohol, lauryl alcohol, stearyl alcohol or the like as well es polyols such as ethyleneglycol, propyleneglycol, 1,3-butanediol, 1,4-butanediol, glycerol, diglycerol, trismethylolpropane, pentaerythritol, dipentaerythritol, erythritol, sorbitol, mannitol or the like.

In addition, the addition of at least one compound (C), which is selected from the group of antioxidants and epoxy compounds, can result in a significant improvement of the colour fastness.

Examples of the aforementioned antioxidants are among others 2,5-di-tert-butylhydroquinone, 2,6-di-tert-butyl-4-methylphenol, 4,4'-thiobis-(3-methyl-6-tert-butylphenol), 2,2'-methylenebis(4-methyl-6-tert-butylphenol), stearyl 3-(3',5'-di-tert-butyl-4'-hydroxyphenyl)propionate and the like.

Among others, various animal or vegetable oils such as epoxy soy oil, epoxy rape oil or the like, epoxidized fatty acid esters such as epoxidized epoxymethyl oleate, epoxybutyl oleate or the like, epoxidized alicyclic compounds, glycidic ethers such as bisphenol A diglycidyl ether, bisphenol F diglycidyl ether or the like, glycidic ester such as glycidyl acrylate, glycidyl methacrylate, polymers and copolymers thereof or the like and epoxidized polymers such as epoxidized polybutadiene, epoxidized ABS or the like come under the aforementioned epoxy compounds.

The addition of at least one of the two compounds (B) and (C) mentioned last is very advantageous.

Formulations of thermoplastic resins wherein the aforementioned substances are used are as follows wherein phr represents parts per 100 parts of resin:

Basic layered lattice compounds according to the invention of
formula I: 0.1 to 5, preferably 0.5 to 3 phr,
Compound (A): 0 to 5, preferably 0.5 to 3 phr,
Compound (B): 0 to 5, preferably 0.1 to 3 phr,
Compound (C): 0 to 5, preferably 0.05 to 4 phr.

Furthermore, additives known to the skilled man such as fillers, lubricants, plasticizers, dyes, pigments, antistatic agents, surface-active agents, foaming agents, impact resistance modifiers, UV stabilizers can be added to the halogen-containing thermoplastic resin composition according to the invention.

According to the invention thermal stability and initial colouring as well as colour fastness of the halogen-containing thermoplastic resin can be further improved by the addition of metal carboxylates (A), particularly along with compound (B) or compound (C) or a mixture of compounds (B) and (C) in the stated amounts. It is believed that metal carboxylates (A) act as a stabilizer and compound (B) and compound (C) act as co-stabilizers.

The composition according to the invention does not show any plate out phenomenon during calendering and permits long-time extrusion processing. In addition, the products resulting thereof are free of any discolouration.

Therefore, the present invention is also directed to halogen-containing thermoplastic resins containing 0.5 to 5 parts of the basic layered lattice compounds according to the invention and in particular to halogen-containing thermoplastic resins containing 0.1 to 5 parts of the basic layered lattice compounds according to the invention which are selected from the group consisting of PVC, polyvinylidene chloride, chlorinated or chlorosulphonated polyethylene, chlorinated polypropylene or chlorinated ethylene/vinylacetate copolymer.

Thus, the present invention constitutes a remarkable novel contribution to the development of the state of the art, in particular to the processing of PVC and other halogen-containing thermoplastic resins.

The invention will be further illustrated by the following examples, however, without being limited thereto.

I. Preparation of the Compounds of the Invention According to the Embodiment of General Formula (I), wherein $Me^{IV}$ is $Me^{IV}O$ and wherein $Me^{IV}$ is a tetravalent metal selected from the group consisting of $titanium^{IV}$, tin, zirconium or a mixture thereof and a/b=1:1 to 1:10; $2 \leq b \leq 10$; $0<c<5$; $0<d$; $0 \leq e$; $0 \leq m<5$ and d, e and f are chosen such that a basic charge-free molecule results.

EXAMPLE 1 (Compound 1)

In a 1 l round bottom flask 0.2 moles (23.6 g) of $NaAl(OH)_4$ are dissolved in 300 ml of distilled water. 0.4 Moles (16.0 g) of magnesium oxide are added thereto and stirred for half an hour. Then 0.006 moles (0.96 g) of titanyl sulphate in 10 ml of distilled water are added and again stirred for 30 minutes. $CO_2$ is then introduced therein until a pH value of 9 is obtained which is subsequently boiled off again to obtain a pH value of 10. It is then heated in an autoclave at 180° C. and stirred at this temperature for five hours. The resulting precipitate is filtered, washed with water, ground to <10 μm, coated with 2% sodium stearate and dried at 120° C. in a vacuum.

EXAMPLE 2 (Compound 2)

The reaction took place as in Example 1, however, 0.012 moles (1.91 g) of titanyl sulphate were used.

EXAMPLE 3 (Compound 3)

The reaction took place as in Example 1, however, 0.024 moles (3.82 g) of titanyl sulphate were used.

EXAMPLE 4 (Compound 4)

The reaction took place as in Example 1, however, 0.45 moles (18.0 g) of magnesium oxide and 0.036 moles (5.73 g) of titanyl sulphate were used. Furthermore, the reaction product was dried for 4 h at 230° C.

EXAMPLE 5 (Compound 5)

The reaction took place as in Example 1, however, 0.3 moles (12.0 g) of magnesium oxide and 0.042 moles (6.68 g) of titanyl sulphate were used. Furthermore, the reaction product was dried for 100 h at 230° C.

Tab. 1 - Compounds according to the invention obtained and analytical values thereof

| | % Mg | % Ti | % Al | % $CO_2$ | Formula |
|---|---|---|---|---|---|
| Compound 1 | 20.9 | 0.6 | 11.6 | 10.1 | $Mg_{4.0}TiO_{0.06}Al_{2.0}(OH)_{12.0}(CO_3)_{1.06}*2.0H_2O$ |
| Compound 2 | 21.5 | 1.4 | 12.5 | 11.1 | $Mg_{4.0}TiO_{0.12}Al_{2.0}(OH)_{12.0}(CO_3)_{1.12}*0.6H_2O$ |
| Compound 3 | 19.9 | 2.3 | 11.1 | 7.9 | $Mg_{4.0}TiO_{0.24}Al_{2.0}(OH)_{12.8}(CO_3)_{0.84}*3.0H_2O$ |
| Compound 4 | 22.7 | 3.5 | 10.8 | 6.1 | $Mg_{4.5}TiO_{0.36}Al_{2.0}(OH)_{16.0}(CO_3)_{0.72}$ |
| Compound 5 | 21.0 | 5.6 | 15.5 | 3.7 | $Mg_{3.0}TiO_{0.42}Al_{2.0}(OH)_{8.6}O_{1.8}(CO_3)_{0.3}$ |

Use of these Compounds as Stabilizers

Thermal stability, initial colouring and colour fastness of PVC mouldings with compounds according to the invention as co-stabilisers or comparative samples without any co-stabilisers have been evaluated in the following examples. To this end PVC resin materials having the compositions indicated below and wherein "test specimen" refers to compounds 1–5 of the preparation examples were homogenized and plasticized on a laboratory rolling mill at 180° C. for five minutes. A sample strip of a width of 10 mm was cut out from the thus produced rolled sheet of about 1 mm in thickness and tempered in a Mathis Thermo Oven at 180° C. The test strip was driven out of the oven for 23 mm in intervals of 10 min until it showed a black discoloration (MTT (Mathis-Thermo-Test) as min=stability).

Tab. 2 - Test formulations

| Formulation | 1 | 2 |
|---|---|---|
| PVC | 100 | 100 |
| Chalk | 5 | 40 |
| DOP | — | 40 |
| $TiO_2$ | 4 | — |
| Modifier | 7 | — |
| Flowing aid | 1 | — |
| GM[a] | 0,3 | — |
| Bisphenol A | 0,1 | 0,1 |
| Zinc stearate | 1,5 | 0,8 |
| Dipentaerythritol | 0,9 | — |
| Dibenzoylmethane | 0,25 | 0,25 |
| Test specimen | 1 | 3,25 |

[a] ester wax as lubricant
DOP = dioctyl phthalate

EXAMPLE 6

Tab. 3 - Results of the use of the compounds according to the invention of Examples 1 to 5 in formulation 1
(YIO = Yellowness index of the initial colouring)

| Compd. | MTT | YIO |
|---|---|---|
| none | 90 | 7,5 |
| Alcamizer 1 | 145 | 8,8 |
| 1 | 155 | 7,3 |
| 2 | 165 | 6,7 |
| 3 | 180 | 8,5 |
| 4 | 150 | 7,3 |
| 5 | 165 | 6,9 |

Alcamizer 1: commercial hydrotalcite according to DE-A-3019632

EXAMPLE 7

Tab. 4 - Results of the use of the compounds according to the invention of Examples 1 to 5 in formulation 2
(VDE = Congo Red value)

| Compound | MTT | VDE | YIO |
|---|---|---|---|
| Alcamizer 1 | 320 | 90 | 43 |
| 1 | 345 | 95 | 43 |
| 2 | 360 | 99 | 43 |
| 3 | 365 | 97 | 43 |
| 4 | 365 | 99 | 43 |
| 5 | 340 | 92 | 42 |

Comparative tests are showing the superiority of the resins stabilised according to the invention with regard to the halogen-containing thermoplastic resins which are not stabilized or stabilized with a stabilizer known from the state of the art based on hydrotalcites.

II. Preparation of the Compounds of the Invention According to the Embodiment of General Formula II EXAMPLE 1 (Compd. 1)

In a 500 ml three-necked flask equipped with a condenser, thermometer and dropping funnel 0.48 moles (35.5 g) of $Ca(OH)_2$ are suspended in 150 ml of distilled water. 0.34 Moles (31.2 g) of $NaAlO_2$ are slowly dropped in and 0.17 moles (19.7 g) of maleic acid are added. Then it is stirred for 30 min. It is then cooled to about 0° C. and 0.09 moles (17.0 g) of titanium tetrachloride are dropped in cautiously. It is then heated at 85° C. and stirred at this temperature for five hours. Then it is filtered off, ground to <1 μm, washed and dried at about 120° C. in a vacuum.

| Product obtained: | $Ca_{0.48}Ti_{0.09}Al_{0.34}(OH)_2(C_4H_2O_4)_{0.17}$ | |
|---|---|---|
| Analysis: | Ca 21.9% | (calc. 22.3) |
| | Ti 4.5% | (calc. 5.0) |
| | Al 11.0% | (calc. 10.7) |

EXAMPLE 2 (Compd. 2)

In a 500 ml three-necked flask equipped with a condenser, thermometer and dropping funnel 0.41 moles (30.3 g) of $Ca(OH)_2$ are suspended in 150 ml of distilled water. 0.37 Moles (30.3 g) of $NaAlO_2$ are slowly dropped in and 0.19 moles (22.6 g) of maleic acid are added. Then it is stirred for 30 min. It is then cooled to about 0° C. and 0.11 moles (28.6 g) of tin tetrachloride are dropped in cautiously. It is then heated at 85° C. and stirred at this temperature for five hours. The precipitate obtained is filtered off, washed with water, ground to <1 μm, coated with 2% sodium stearate and dried at 120° C. in a vacuum.

| Product obtained: | $Ca_{0.41}Sn_{0.11}Al_{0.37}(OH)_2(C_4H_2O_4)_{0.19}$ | |
|---|---|---|
| Analysis: | Ca 18.1% | (calc. 17.2) |
| | Sn 14.1% | (calc. 13.8) |
| | Al 11.5% | (calc. 10.5) |

EXAMPLE 3 (Compd. 3)

In a 500 ml three-necked flask equipped with a condenser, thermometer and dropping funnel 0.53 moles (39.2 g) of $Ca(OH)_2$ are suspended in 150 ml of distilled water. 0.29 Moles (23.8 g) of $NaAlO_2$ are slowly dropped in with stirring. Then it is stirred for half an hour. It is then cooled to about 0° C. and 0.09 moles (21.0 g) of zirconium tetrachloride are dropped in cautiously. It is then heated at 85° C. and stirred at this temperature for five hours. The precipitate obtained is filtered off, washed with water, ground to <1 μm, coated with 2% sodium stearate and dried at 120° C. in a vacuum.

| Product obtained: | $Ca_{0.53}Zr_{0.09}Al_{0.29}(OH)_2(OH)_{0.29}$ *$0.5H_2O$ | |
|---|---|---|
| Analysis: | Ca 25.2% | (calc. 24.9) |
| | Zr 9.3% | (calc. 9.7) |
| | Al 9.0% | (calc. 9.2) |

EXAMPLE 4 (Compd. 4)

In a 500 ml three-necked flask equipped with a condenser, thermometer and dropping funnel 0.42 moles (31.1 g) of $Ca(OH)_2$ are suspended in 150 ml of distilled water. 0.36 Moles (29.5 g) of $NaAlO_2$ and 0.18 moles (14.9 g) of phosphorous acid are slowly dropped in with stirring. Then it is stirred for half an hour and it is then cooled to about 0° C. At this temperature 0.11 moles (20.9 g) of titanium tetrachloride are dropped in cautiously. It is then heated at 85° C. and stirred at this temperature for five hours. The precipitate obtained is filtered off, washed with water, ground to <1 μm, coated with 2% sodium stearate and dried at 120° C. in a vacuum.

| Product obtained: | $Ca_{0.42}Ti_{0.11}Al_{0.36}(OH)_2(HPO_3)_{0.18}$ *$0.5H_2O$ | |
|---|---|---|
| Analysis: | Ca 18.5% | (calc. 18.8) |
| | Ti 6.1% | (calc. 5.9) |
| | Al 10.5% | (calc. 10.9) |
| | P 6.8% | (calc. 6.3) |

EXAMPLE 5 (Comp. 5)

In a 1 l round bottom flask 0.34 moles (40.1 g) of $NaAl(OH)_4$ are dissolved in 300 ml of distilled water. 0.5 Moles (20.0 g) of magnesium oxide are added and it is stirred for half an hour. Then 0.08 moles (20.8 g) of $SnCl_4$ are added from a dropping funnel and it is again stirred for a while. After the addition of $SnCl_4$ the pH value is 7.4. After stirring for one hour the pH value has increased to 10.1. Then $CO_2$ is introduced until a pH value of 9 is obtained which is subsequently boiled off again to obtain a pH value of 10. It is then heated at 85° C. and stirring is continued for five hours at this temperature. The precipitate obtained is filtered off, washed with water, ground to <1 μm, coated with 2% sodium stearate and dried at 120° C. in a vacuum.

| Product obtained: | $Mg_{0.50}Sn_{0.08}Al_{0.34}(OH)_2(CO_3)_{0.17}$ *$0.3H_2O$ | |
|---|---|---|
| Analysis: | Mg 15.2% | (calc. 14.9) |
| | Sn 12.2% | (calc. 11.8) |
| | Al 12.2% | (calc. 11.4) |
| | $CO_2$ 8.3% | (calc. 9.3) |

EXAMPLE 6 (Compd. 6)

In a 1 l round bottom flask 0.34 moles (40.1 g) of $NaAl(OH)_4$ are dissolved in 300 ml of distilled water. 0.5 Moles (20.0 g) of magnesium oxide are added and it is stirred or half an hour. Then 0.08 moles (18.6 g) of $ZrCl_4$ are added from a dropping funnel and it is again stirred for a while. After the addition of $ZrCl_4$ the pH value is 10. Then $CO_2$ is introduced until a pH value of 9 is obtained which is subsequently boiled off again to obtain a pH value of 10. It is then heated at 85° C. and stirring is continued for five hours at this temperature. The precipitate obtained is filtered off, washed with water, ground to <1 μm, coated with 2% sodium stearate and dried at 120° C. in a vacuum.

| Product obtained: | $Mg_{0.50}Zr_{0.08}Al_{0.34}(OH)_2(CO_3)_{0.17}$ *$0.3H_2O$ | |
|---|---|---|
| Analysis: | Mg 16.1% | (calc. 15.4) |
| | Zr 8.8% | (calc. 9.3) |
| | Al 12.2% | (calc. 11.8) |
| | $CO_2$ 8.8% | (calc. 9.6) |

EXAMPLE 7 (Compd. 7)

In a 1 l round bottom flask 0.32 moles (37.1 g) of $NaAl(OH)_4$ are dissolved in 300 ml of distilled water. 0.52 Moles (20.8 g) of magnesium oxide are added and it is stirred for half an hour. Then 0.08 moles (15.2 g) of $TiCl_4$ are added from the dropping funnel and it is again stirred for a while. After the addition of $TiCl_4$ the pH value is 10.7. Then $CO_2$ is introduced until a pH value of 9 is obtained which is subsequently boiled off again to obtain a pH value of 10. It is then heated at 85° C. and stirring is continued for five hours at this temperature. The precipitate obtained is filtered off, washed with water, ground to <1 μm, coated with 2% sodium stearate and dried at 120° C. in a vacuum.

| Product obtained: | $Mg_{0.52}Ti_{0.08}Al_{0.32}(OH)_2(CO_3)_{0.16}$ *$0.3H_2O$ | |
|---|---|---|
| Analysis: | Mg 16.7% | (calc. 16.7) |
| | Ti 5.3% | (calc. 5.1) |
| | Al 11.8% | (calc. 11.6) |
| | $CO_2$ 9.8% | (calc. 10.0) |

EXAMPLE 8 (Compd. 8)

In a 1 l round bottom flask 0.34 moles (40.1 g) of $NaAl(OH)_4$ are dissolved in 300 ml of distilled water. 0.5 Moles (20.0 g) of magnesium oxide are added and it is stirred for half an hour. Then 0.08 moles (20.8 g) of $SnCl_4$ are added from the dropping funnel and it is again stirred for a while. After the addition of $SnCl_4$ the pH value is 7.4. After stirring for one hour the pH value has increased to 10.1. Then $CO_2$ is introduced until a pH value of 9 is obtained which is subsequently boiled off again to obtain a pH value of 10. It is then heated in an autoclave at 180° C. and stirring is continued for five hours at this temperature. The precipitate obtained is filtered off, washed with water, ground to <1

μm, coated with 2% sodium stearate and dried at 120° C. in a vacuum.

| Product obtained: | $Mg_{0.50}Sn_{0.08}Al_{0.34}(OH)_2(CO_3)_{0.17}$ *$0.3H_2O$ | |
|---|---|---|
| Analysis: | Mg 14.2% | (calc. 14,9) |
| | Sn 11.0% | (calc. 11.8) |
| | Al 11.3% | (calc. 11.4) |
| | $CO_2$ 8.8% | (calc. 9.3) |

EXAMPLE 9 (Compd. 9)

In a 1 l round bottom flask 0.34 moles (40.1 g) of $NaAl(OH)_4$ are dissolved in 300 ml of distilled water. 0.5 Moles (20.0 g) of magnesium oxide are added and it is stirred for half an hour. Then 0.08 moles (18.6 g) of $ZrCl_4$ are added from the dropping funnel and it is again stirred for a while. After the addition of $ZrCl_4$ the pH value is 10. Then $CO_2$ is introduced until a pH value of 9 is obtained which is subsequently boiled off again to obtain a pH value of 10. Then it is heated in an autoclave at 180° C. and stirring is continued for five hours at this temperature. The precipitate obtained is filtered off, washed with water, ground to <1 μm, coated with 2% sodium stearate and dried at 120° C. in a vacuum.

| Product obtained: | $Mg_{0.50}Zr_{0.08}Al_{0.34}(OH)_2(CO_3)_{0.17}$ *$0.3H_2O$ | |
|---|---|---|
| Analysis: | Mg 15.2% | (calc. 15.4) |
| | Zr 9.9% | (calc. 9.3) |
| | Al 11.5% | (calc. 11.8) |
| | $CO_2$ 9.8% | (calc. 9.6) |

EXAMPLE 10 (Compd. 10)

In a 1 l round bottom flask 0.32 moles (37.1 g) of $NaAl(OH)_4$ are dissolved in 300 ml of distilled water. 0.52 Moles (20.8 g) of magnesium oxide are added and it is stirred for half an hour. Then 0.08 moles (15.2 g) of $TiCl_4$ are added from the dropping funnel and it is again stirred for a while. After the addition of $TiCl_4$ the pH value is 10.7. Then $CO_2$ is introduced until a pH value of 9 is obtained which is subsequently boiled off again to obtain a pH value of 10. It is heated in an autoclave at 180° C. and stirring is continued for five hours at this temperature. The precipitate obtained is filtered off, washed with water, ground to <1 μm, coated with 2% sodium stearate and dried at 120° C. in a vacuum.

| Product obtained: | $Mg_{0.52}Ti_{0.08}Al_{0.32}(OH)_2(CO_3)_{0.16}$ *$0.3H_2O$ | |
|---|---|---|
| Analysis: | Mg 17.2% | (calc. 16.7) |
| | Ti 5.6% | (calc. 5.1) |
| | Al 11.6% | (calc. 11.6) |
| | $CO_2$ 9.5% | (calc. 10.0) |

Use of these Compounds as Stabilizers

Thermal stability, initial colouring and colour fastness of PVC mouldings with compounds according to the invention as co-stabilisers or comparative samples without any co-stabilisers have been evaluated in the following examples.

Tab. 1 Test formulations

| Formulation | 1 | 2 | 3 | 4 | 5 | 6 | 7 |
|---|---|---|---|---|---|---|---|
| Example | 11 | 12 | 13 | 14 | 15 | 16 | 17 |
| Table | 2 | 3 | 4 | 5 | 6 | 7 | 8 |
| PVC | 100 | 100 | 100 | 100 | 100 | 100 | 100 |
| Chalk | 5 | 5 | 5 | — | — | 5 | — |
| $TiO_2$ | 4 | 4 | 4 | — | — | 4 | — |
| Gm[a] | 0.5 | 0.5 | 0.5 | — | — | 0.5 | 0.3 |
| Bisphenol A | 0.1 | 0.1 | 0.1 | 0.1 | 0.1 | 0.1 | 0.1 |
| Irg. 17 MOK | — | — | — | — | — | 1 | 1 |
| Calcium stearate | 0.5 | 0.5 | 0.5 | 0.8 | — | 1 | — |
| Barium stearate | — | — | — | — | 0.8 | — | — |
| Zinc stearate | 0.8 | 0.8 | 0.8 | 0.8 | 0.8 | — | — |
| Pentaerythritol | 0.4 | 0.4 | 0.4 | — | — | — | — |
| Dibenzoylmethane | 0.1 | — | — | — | — | — | — |
| Ca-Acetylacetonate | — | — | 0.1 | — | — | — | — |
| DOP | — | — | — | 40 | 40 | — | 50 |
| TNPP | — | — | — | 0.5 | — | — | — |
| Sample | 1 | 1 | 1 | 1 | 1 | 1 | 1 |

[a] Paraffin wax as lubricant

Example 11
Tab. 2 Test formulation 1

| Compound | MTT/min. | VDE/min. | YI0 | YI10 | YI20 | YI30 | YI40 | YI50 | YI60 | YI70 | YI80 |
|---|---|---|---|---|---|---|---|---|---|---|---|
| no sample | 57 | 14:00 | 6.5 | 8.3 | 12.2 | 17.3 | 31.5 | 36.7 | | | |
| Compound 1 | 67 | 16:50 | 5.0 | 7.1 | 11.0 | 16.8 | 27.0 | 30.1 | 35.1 | | |
| Compound 2 | 68 | 16:00 | 5.9 | 7.0 | 9.3 | 13.1 | 24.4 | 28.0 | 33.5 | | |
| Compound 3 | 73 | 17:15 | 5.0 | 7.4 | 10.8 | 14.3 | 24.4 | 27.8 | 33.4 | 47.9 | |
| Compound 4 | 66 | 15:45 | 5.6 | 7.5 | 9.9 | 14.5 | 25.9 | 29.5 | 34.6 | | |
| Compound 5 | 71 | 17:00 | 5.3 | 7.5 | 11.3 | 16.0 | 28.7 | 32.2 | 36.3 | 50.2 | |
| Compound 6 | 85 | 20:00 | 5.5 | 7.3 | 9.7 | 13.7 | 24.4 | 27.4 | 31.8 | 35.6 | 48.1 |
| Compound 7 | 68 | 16:45 | 5.4 | 7.1 | 9.9 | 14.0 | 27.2 | 30.3 | 35.9 | | |
| Compound 8 | 103 | 22:00 | 5.5 | 7.8 | 10.9 | 15.7 | 27.7 | 31.1 | 36.4 | 37.3 | 43.8 |
| Compound 9 | 74 | 18:00 | 5.7 | 6.9 | 8.8 | 11.7 | 23.0 | 26.8 | 33.5 | 45.9 | |
| Compound 10 | 75 | 19:00 | 5.6 | 6.2 | 9.4 | 12.4 | 27.0 | 27.3 | 33.9 | 46.3 | |

| Compound | MTT/min. |
|---|---|
| Example 12 Tab. 3 Test formulation 2 | |
| No sample | 44 |
| Compound 1 | 51 |
| Compound 3 | 53 |
| Compound 4 | 50 |

-continued

| Compound | MTT/min. |
|---|---|
| Compound 7 | 51 |
| Compound 8 | 69 |
| Compound 9 | 72 |
| Compound 10 | 52 |
| Example 13 | |
| Tab. 4 Test formulation 3 | |
| No sample | 59 |
| Compound 1 | 78 |
| Compound 3 | 91 |
| Compound 4 | 77 |
| Compound 7 | 81 |
| Compound 8 | 102 |
| Compound 9 | 86 |
| Compound 10 | 85 |
| Example 14 | |
| Tab. 5 Test formulation 4 | |
| No sample | 36 |
| Compound 1 | 43 |
| Compound 2 | 42 |
| Compound 4 | 44 |
| Compound 8 | 85 |
| Compound 9 | 86 |
| Compound 10 | 58 |
| Example 15 | |
| Tab. 6 Test formulation 5 | |
| ohne Probe | 35 |
| Compound 1 | 63 |
| Compound 2 | 65 |
| Compound 4 | 62 |
| Compound 7 | 65 |
| Compound 8 | 80 |
| Compound 9 | 78 |
| Compound 10 | 62 |
| Example 16 | |
| Tab. 7 Test formulation 6 | |
| ohne Probe | 95 |
| Compound 1 | 115 |
| Compound 2 | 110 |
| Compound 3 | 125 |
| Compound 4 | 125 |
| Compound 8 | 135 |
| Compound 9 | 130 |
| Compound 10 | 125 |
| Example 17 | |
| Tab.8 Test formulation 7 | |
| ohne Probe | 105 |
| Compound 1 | 175 |
| Compound 2 | 180 |
| Compound 3 | 170 |
| Compound 4 | 140 |
| Compound 5 | 190 |
| Compound 6 | 190 |
| Compound 7 | 170 |
| Compound 10 | 210 |

II. Preparation of the Compounds of the Invention According to the Embodiment of General Formula III EXAMPLE 1 (Compd. 1)

In a 500 ml three-necked flask equipped with a condenser, thermometer and dropping funnel 0.46 moles (34.1 g) of $Ca(OH)_2$ are suspended in 150 ml of distilled water. 0.34 Moles (31.2 g) of $NaAlO_2$ are dropped in slowly with stirring and 0.27 moles (31.3 g) of maleic acid are added. Then it is stirred for 30 min. It is then cooled to about 0° C. and 0.1 moles (19.0 g) of titanium tetrachloride are dropped in cautiously. Then it is heated at 85° C. and stirred at this temperature for five hours. Then it is filtered off, ground to <1 μm, washed and dried at about 120° C. in a vacuum.

| Product obtained: | $Ca_{0.46}Ti_{0.10}Al_{0.34}(OH)_{1.8}(C_4H_2O_4)_{0.27}$ | |
|---|---|---|
| Analysis: | Ca 19.9% | (calc. 19.6) |
| | Ti 4.5% | (calc. 5.1) |
| | Al 10.1% | (calc. 9.8) |

EXAMPLE 2 (Compd. 2)

In a 500 ml three-necked flask equipped with a condenser, thermometer and dropping funnel 0.43 moles (30.1 g) of $Ca(OH)_2$ are suspended in 150 ml of distilled water. 0.37 Moles (30.3 g) of $NaAlO_2$ are dropped in slowly with stirring and 0.24 moles (27.8 g) of maleic acid are added. Then it is stirred for 30 min. It is then cooled to about 0° C. and 0.10 moles (26.0 g) of tin tetrachloride are dropped in cautiously. It is then heated at 85° C. and stirred at this temperature for five hours. The precipitate obtained is filtered off, washed with water, ground to <1 μm, coated with 2% sodium stearate and dried at about 120° C. in a vacuum.

| Product obtained: | $Ca_{0.43}Sn_{0.10}Al_{0.37}(OH)_{1.9}(C_4H_2O_4)_{0.24}$ | |
|---|---|---|
| Analysis: | Ca 17.1% | (calc. 17.4) |
| | Sn 13.2% | (calc. 12.0) |
| | Al 9.7% | (calc. 10.1) |

EXAMPLE 3 (Compd. 3)

In a 500 ml three-necked flask equipped with a condenser, thermometer and dropping funnel 0.48 moles (35.5 g) of $Ca(OH)_2$ are suspended in 150 ml of distilled water. 0.31 Moles (25.4 g) of $NaAlO_2$ are dropped in slowly with stirring and 0.07 moles (81 g) of fumaric acid are added. Then it is stirred for half an hour. It is then cooled to about 0° C. and 0.1 moles (23.3 g) of zirconium tetrachloride are dropped in cautiously. It is then heated at 85° C. and stirred at this temperature for five hours. The precipitate obtained is filtered off, washed with water, ground to <1 μm, coated with 2% sodium stearate and dried at about 120° C. in a vacuum.

| Product obtained: | $Ca_{0.48}Zr_{0.10}Al_{0.31}(OH)_{2.15}(C_4H_2O_4)_{0.07}$ | |
|---|---|---|
| Analysis: | Ca 24.2% | (calc. 23.6) |
| | Zr 10.7% | (calc. 11.2) |
| | Al 9.9% | (calc. 10.3) |

EXAMPLE 4 (Compd. 4)

In a 500 ml three-necked flask equipped with a condenser, thermometer and dropping funnel 0.4 moles (29.6 g) of $Ca(OH)_2$ are suspended in 150 ml of distilled water. 0.36 Moles (29.5 g) of $NaAlO_2$ and 0.13 moles (10.7 g) of phosphorous acid are dropped in slowly with stirring. Then it is stirred for half an hour and it is then cooled to about 0° C. At this temperature 0.1 moles (19.0 g) of titanium tetrachloride are dropped in cautiously. It is then heated at 85° C. and stirred at this temperature for five hours. The precipitate obtained is filtered off, washed with water, ground to <1 μm, coated with 2% sodium stearate and dried at about 120° C. in a vacuum.

| Product obtained: | $Ca_{0.40}Ti_{0.10}Al_{0.36}(OH)_{2.1}(HPO_3)_{0.13}$ | |
|---|---|---|
| Analysis: | Ca 19.8% | (calc. 20.9) |
| | Ti 6.4% | (calc. 6.3) |

|   |   |
|---|---|
| Al 11.5% | (calc. 12.7) |
| P 5.8% | (calc. 5.3) |

EXAMPLE 5 (Compd. 5)

In a 1 l round bottom flask 0.31 moles (36.6 g) of NaAl(OH)$_4$ are dissolved in 300 ml of distilled water. 0.5 Moles (20.0 g) of magnesium oxide are added and it is stirred for half an hour. Then 0.1 moles (26.0 g) of SnCl$_4$ are added from a dropping funnel and it is again stirred for a while. After the addition of SnCl$_4$ the pH value is 7.4. After stirring for one hour the pH value rose to 10.1. Then CO$_2$ is introduced until a pH value of 9 is obtained which is subsequently boiled off again to obtain a pH value of 10. Then it is heated at 85° C. and stirring is continued for five hours at this temperature. The precipitate obtained is filtered off, washed with water, ground to <1 µm, coated with 2% sodium stearate and dried at 120° C. in a vacuum.

| Product obtained: | Mg$_{0.50}$Sn$_{0.10}$Al$_{0.31}$(OH)$_{1.7}$(CO$_3$)$_{0.32}$ |   |
|---|---|---|
| Analysis: | Mg 14.2% | (calc. 14.9) |
|  | Sn 14.4% | (calc. 14.8) |
|  | Al 10.2% | (calc. 10.4) |
|  | CO$_2$ 18.1% | (calc. 17.5) |

EXAMPLE 6 (Compd. 6)

In a 1 l round bottom flask 0.31 moles (36.6 g) of NaAl(OH)$_4$ are dissolved in 300 ml of distilled water. 0.5 Moles (20.0 g) of magnesium oxide are added and it is stirred for half an hour. Then 0.1 moles (23.3 g) of ZrCl$_4$ are added from the dropping funnel and it is again stirred for a while. After the addition of ZrCl$_4$ the pH value is 10. Then CO$_2$ is introduced until a pH value of 9 is obtained which is subsequently boiled off again to obtain a pH value of 10. Then it is heated 85° C. and stirring is continued for five hours at this temperature. The precipitate obtained is filtered off, washed with water, ground to <1 µm, coated with 2% sodium stearate and dried at 120° C. in a vacuum.

| Product obtained: | Mg$_{0.50}$Zr$_{0.10}$Al$_{0.31}$(OH)$_{1.8}$(CO$_3$)$_{0.27}$ |   |
|---|---|---|
| Analysis: | Mg 16.0% | (calc. 15.7) |
|  | Zr 11.8% | (calc. 12.0) |
|  | Al 12.0% | (calc. 11.0) |
|  | CO$_2$ 15.7% | (calc. 15.6) |

EXAMPLE 7 (Compd. 7)

In a 1 l round bottom flask 0.31 moles (36.6 g) of NaAl(OH)$_4$ are dissolved in 300 ml of distilled water. 0.5 Moles (20.0 g) of magnesium oxide are added and it is stirred for half an hour. Then 0.1 moles (19.0 g) of TiCl$_4$ are added from the dropping funnel and it is again stirred for a while. After the addition of TiCl$_4$ the pH value is 10.7. Then CO$_2$ is introduced until a pH value of 9 is obtained which is subsequently boiled off again to obtain a pH value of 10. Then it is heated at 85° C. and stirring is continued for five hours at this temperature. The precipitate obtained is filtered off, washed with water, ground to <1 µm, coated with 2% sodium stearate and dried at 120° C. in a vacuum.

| Product obtained: | Mg$_{0.50}$Ti$_{0.10}$Al$_{0.31}$(OH)$_{1.8}$(CO$_3$)$_{0.27}$ |   |
|---|---|---|
| Analysis: | Mg 16.5% | (calc. 16.8) |
|  | Ti 6.4% | (calc. 6.7) |
|  | Al 11.8% | (calc. 11.7) |
|  | CO$_2$ 15.8% | (calc. 16.0) |

EXAMPLE 8 (Compd. 8)

In a 1 l round bottom flask 0.31 moles (36.6 g) of NaAl(OH)$_4$ are dissolved in 300 ml of distilled water. 0.5 Moles (20.0 g) of magnesium oxide are added and it is stirred for half an hour. Then 0.1 moles (26.0 g) of SnCl$_4$ are added from a dropping funnel and it is again stirred for a while. After the addition of SnCl$_4$ the pH value is 7.4. After stirring for one hour the pH value rose to 10.1. Then CO$_2$ is introduced until a pH value of 9 is obtained which is subsequently boiled off again to obtain a pH value of 10. Then it is heated in an autoclave at 180° C. and stirring is continued for five hours at this temperature. The precipitate obtained is filtered off, washed with water, ground to <1 µm, coated with 2% sodium stearate and dried at 120° C. in a vacuum.

| Product obtained: | Mg$_{0.50}$Sn$_{0.10}$Al$_{0.31}$(OH)$_{1.9}$(CO$_3$)$_{0.22}$ |   |
|---|---|---|
| Analysis: | Mg 16.2% | (calc. 15.4) |
|  | Sn 15.4% | (calc. 15.3) |
|  | Al 11.3% | (calc. 10.8) |
|  | CO$_2$ 11.8% | (calc. 12.5) |

EXAMPLE 9 (Compd. 9)

In a 1 l round bottom flask 0.31 moles (36.6 g) of NaAl(OH)$_4$ are dissolved in 300 ml of distilled water. 0.5 Moles (20.0 g) of magnesium oxide are added and it is stirred for half an hour. Then 0.1 moles (23.3 g) of ZrCl$_4$ are added from a dropping funnel and it is again stirred for a while. After the addition of ZrCl$_4$ the pH value is 10. Then CO$_2$ is introduced until a pH value of 9 is obtained which is subsequently boiled off again to obtain a pH value of 10. Then it is heated in an autoclave at 180° C. and stirring is continued for five hours at this temperature. The precipitate obtained is filtered off, washed with water, ground to <1 µm, coated with 2% sodium stearate and dried at 120° C. in a vacuum.

| Product obtained: | Mg$_{0.50}$Zr$_{0.10}$Al$_{0.31}$(OH)$_{1.8}$(CO$_3$)$_{0.27}$ |   |
|---|---|---|
| Analysis: | Mg 15.2% | (calc. 15.7) |
|  | Zr 11.9% | (calc. 12.0) |
|  | Al 11.3% | (calc. 11.0) |
|  | CO$_2$ 14.8% | (calc. 15.6) |

EXAMPLE 10 (Compd. 10)

In a 1 l round bottom flask 0.31 moles (36.6 g) of NaAl(OH)$_4$ are dissolved in 300 ml of distilled water. 0.5 moles (20.0 g) of magnesium oxide are added and it is stirred for half an hour. Then 0.1 moles (19.0 g) of TiCl$_4$ are added from a dropping funnel and it is again stirred for a while. After the addition of TiCl$_4$ the pH value is 10.7. Then CO$_2$ is introduced until a pH value of 9 is obtained which is subsequently boiled off again to obtain a pH value of 10. Then it is heated in an autoclave at 180° C. and stirring is continued for five hours at this temperature. The precipitate obtained is filtered off, washed with water, ground to <1 µm, coated with 2% sodium stearate and dried at 120° C. in a vacuum.

| Product obtained: | $Mg_{0.05}Ti_{0.10}Al_{0.31}(OH)_{2.1}(CO_3)_{0.11}$ | |
|---|---|---|
| Analysis: | Mg 17.3% | (calc. 17.8) |
| | Ti 6.6% | (calc. 7.1) |
| | Al 12.1% | (calc. 12.4) |
| | $CO_2$ 8.0% | (calc. 7.2) |

Use of these Compounds as Stabilizers

Thermal stability, initial colouring and colour fastness of PVC mouldings with compounds according to the invention as co-stabilisers or comparative samples without any co-stabilisers have been evaluated in the following examples as described above under I.

Tab. 1 Test formulations

| Formulation | 1 | 2 | 3 | 4 | 5 | 6 | 7 |
|---|---|---|---|---|---|---|---|
| Example | 11 | 12 | 13 | 14 | 15 | 16 | 17 |
| Table | 2 | 3 | 4 | 5 | 6 | 7 | 8 |
| PVC | 100 | 100 | 100 | 100 | 100 | 100 | 100 |
| Chalk | 5 | 5 | 5 | — | — | 5 | — |
| $TiO_2$ | 4 | 4 | 4 | — | — | 4 | — |
| Gm[a)] | 0.5 | 0.5 | 0.5 | — | — | 0.5 | 0.3 |
| Bisphenol A | 0.1 | 0.1 | 0.1 | 0.1 | 0.1 | 0.1 | 0.1 |
| Irg. 17 MOK | — | — | — | — | — | 1 | 1 |
| Calcium stearate | 0.5 | 0.5 | 0.5 | 0.8 | — | 1 | — |
| Barium stearate | — | — | — | — | 0.8 | — | — |
| Zinc stearate | 0.8 | 0.8 | 0.8 | 0.8 | 0.8 | — | — |
| Pentaerythritol | 0.4 | 0.4 | 0.4 | — | — | — | — |
| Dibenzoylmethane | 0.1 | — | — | — | — | — | — |
| Ca-Acetylacetonate | — | — | 0.1 | — | — | — | — |
| DOP | — | — | — | 40 | 40 | — | 50 |
| TNPP | — | — | — | 0.5 | — | — | — |
| Sample | 1 | 1 | 1 | 1 | 1 | 1 | 1 |

Example 11
Tab. 2 Test formulation 1

| Compound | MTT/min. | VDE/min. |
|---|---|---|
| No sample | 60 | 14:20 |
| Compound 1 | 65 | 17:00 |
| Compound 2 | 65 | 16:25 |
| Compound 3 | 75 | 17:05 |
| Compound 4 | 65 | 16:00 |
| Compound 5 | 70 | 17:00 |
| Compound 6 | 85 | 19:35 |
| Compound 7 | 65 | 16:15 |
| Compound 8 | 100 | 21:20 |
| Compound 9 | 80 | 17:10 |
| Compound 10 | 70 | 16:55 |

Example 12
Tab. 3 Test formulation 2

| Compound | MTT/min. |
|---|---|
| No sample | 45 |
| Compound 1 | 50 |
| Compound 2 | 55 |
| Compound 4 | 50 |
| Compound 6 | 50 |
| Compound 8 | 75 |
| Compound 9 | 70 |
| Compound 10 | 55 |

Example 13
Tab. 4
Test formulation 3

| Compound | |
|---|---|
| No sample | 60 |
| Compound 1 | 75 |
| Compound 2 | 80 |
| Compound 4 | 75 |
| Compound 7 | 80 |
| Compound 8 | 95 |
| Compound 9 | 80 |
| Compound 10 | 80 |

| Compound | MTT/min. |
|---|---|
| Example 14 Tab. 5 Test formulation 4 | |
| No sample | 35 |
| Compound 1 | 40 |
| Compound 3 | 50 |
| Compound 4 | 45 |
| Compound 8 | 85 |
| Compound 9 | 80 |
| Compound 10 | 55 |
| Example 15 Tab. 6 Testformulation 5 | |
| No sample | 35 |
| Compound 1 | 55 |
| Compound 2 | 60 |
| Compound 3 | 65 |
| Compound 7 | 65 |
| Compound 8 | 80 |
| Compound 9 | 75 |
| Compound 10 | 55 |
| Example 16 Tab. 7 Test formulation 6 | |
| No sample | 95 |
| Compound 1 | 105 |
| Compound 2 | 105 |
| Compound 3 | 120 |
| Compound 4 | 110 |
| Compound 8 | 125 |
| Compound 9 | 120 |
| Compound 10 | 120 |
| Example 17 Tab. 8 Test formulation 7 | |
| No sample | 105 |
| Compound 1 | 150 |
| Compound 2 | 155 |
| Compound 3 | 165 |
| Compound 4 | 150 |
| Compound 5 | 175 |
| Compound 6 | 175 |
| Compound 7 | 160 |
| Compound 10 | 150 |

[a)] Paraffin wax as lubricant

We claim:
1. Basic layered lattice compounds of general formula (I):

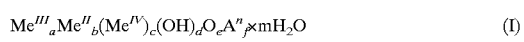

$$Me^{III}_a Me^{II}_b (Me^{IV})_c (OH)_d O_e A^n_f \cdot mH_2O \quad (I)$$

wherein
 $Me^{II}$ represents a divalent metal selected from the group consisting of magnesium, calcium, barium, strontium, zinc, lead$^{II}$, cadmium or a mixture thereof;
 $Me^{III}$ represents a trivalent metal selected from the group consisting of aluminium, bismuth, antimony, titanium$^{III}$, iron$^{III}$ or a mixture thereof;
 $Me^{IV}$ represents a tetravalent metal selected from the group consisting of titanium$^{IV}$, tin, zirconium or a mixture thereof or $Me^{IV}O$ wherein $Me^{IV}$ has the meaning given above;
 $A^n$ represents an anion having a valency n and being selected from the group consisting of sulphate, sulphite, sulphide, thiosulphate, hydrogen sulphate, hydrogen sulphite, hydrogen sulphide, peroxide, peroxosulphate, carbonate, hydrogen carbonate, nitrate, nitrite, phosphate, pyrophosphate, phosphite, pyrophosphite, hydrogen phosphate, hydrogen phosphite, dihydrogen phosphate, dihydrogen phosphite, halide, pseudohalide, halite, halate, perhalate, $I_3^-$, permanganate, amide, azide, hydroxide, hydroxylamide, hydrazide, acetylacetonate, an anion of an organic carboxylic acid having one or more carboxylic acid groups, an anion of mono- or polyvalent phenols or a mixture thereof;

wherein a/b=1:1 to 1:10; $2 \leq b \leq 10$; $0<c<5$; $0 \leq e$; $0 \leq m<5$ and d, e and f are chosen such that a basic charge-free molecule results.

2. Basic layered lattice compounds according to claim 1 wherein a/b=1:1 to 1:9.

3. Basic layered lattice compounds of general formula (I) according to claim 1 wherein $Me^{II}$, $Me^{III}$ and $A^n$ are of the meaning given above and $Me^{IV}$ is $Me^{IV}O$, wherein $Me^{IV}$ is a tetravalent metal selected from the group consisting of titanium$^{IV}$, tin, zirconium or a mixture thereof and a/b=1:1 to 1:10; $2 \leq b \leq 10$; $0<c<5$; $0<d$; $0 \leq e$; $0 \leq m \leq 5$ and d, e and f are chosen such that a basic charge-free molecule results.

4. Basic layered lattice compounds according to claim 3 wherein a/b=2:4 to 2:6.

5. Basic layered lattice compounds according to claim 1, wherein the divalent metal $Me^{II}$ is selected from the group consisting of Mg, Ca, Sn, Zn or a mixture thereof.

6. Basic layered lattice compounds according to claim 1, wherein the trivalent metal $Me^{III}$ is selected from the group consisting of Al, Fe or a mixture thereof.

7. Basic layered lattice compounds according to claim 1, wherein the tetravalent metal$^{IV}$ is selected from the group consisting of Ti, Zr, Sn or a mixture thereof.

8. Basic layered lattice compounds according to claim 1, wherein the anion is selected from the group consisting of carbonate, phosphite, hydroxide, maleate, fumarate, phthalate or a mixture thereof.

9. Basic layered lattice compounds according to claim 1, wherein the divalent metal $Me^{II}$ is Mg, the trivalent metal $Me^{III}$ is Al, the tetravalent metal $Me^{IV}$ is Ti and the anion is carbonate.

10. Process for the production of the basic layered lattice compounds according to claim 1, comprising reacting $Me^{II}$ as a hydroxide, oxide or a mixture thereof, $Me^{III}$ as a hydroxide, further as a mixed salt with NaOH, as well as $Me^{IV}$ as a hydroxide, oxy salt, oxide or mixtures thereof with an acid, a salt of the acid or mixtures thereof wherein the anion of the acid has the meaning given above in an aqueous medium at a pH value of 8 to 12 at temperatures from 20 to 250° C.

11. Process for the production of the basic layered lattice compounds according to claim 10, wherein the reaction is carried out at a pH value of 9 to 11 at temperatures from 60 to 180° C.

12. Process for the production of the basic layered lattice compounds according to claim 11, wherein $Me^{IV}$ is a freshly precipitated hydroxide, oxy salt, oxide or mixtures thereof.

13. Process for the production of the basic layered lattice compounds according to claim 10, wherein $Me^{IV}$ is a freshly precipitated hydroxide, oxy salt, oxide or mixtures thereof.

14. The basic layered lattice compound according to claim 1, wherein the basic layered lattice compound is used for the stabilization of halogen-containing thermoplastic resins.

15. The basic layered lattice compound according to claim 14, wherein the halogen-containing thermoplastic resin is PVC.

16. Stabilizer for halogen-containing polymers comprising a content of at least one basic layered lattice compound according to claim 1.

17. Stabilizer for halogen-containing polymers according to claim 16, wherein the halogen containing polymer is PVC.

18. Stabilizer according to claim 16, further comprising at least one co-stabilizer selected from the group consisting of metal carboxylates, 1,3-diketo compounds, organic esters of phosphorous acid, polyols and amino acid derivatives, antioxidants and epoxy compounds.

19. Process for the production of halogen-containing thermoplastic resins comprising adding a stabilizer according to claim 16 in an amount of 0.1 to 5 parts per 100 parts of resin to the halogen-containing thermoplastic resins in a molten state, thoroughly stirring and allowing to cool.

20. Process for the production of halogen-containing thermoplastic resins comprising adding a stabilizer according to claim 16 in an amount of 0.1 to 5 parts per 100 parts of resin to the halogen-containing thermoplastic resins in a molten state, thoroughly stirring and allowing to cool.

21. Halogen-containing thermoplastic resins comprising from 0.1 to 5 parts of stabilizer according to claim 16 per 100 parts of resin.

22. Halogen-containing thermoplastic resins according to claim 21, wherein the halogen-containing thermoplastic resin is selected from the group consisting of PVC, polyvinylidene chloride, chlorinated or chlorosulphonated polyethylene, chlorinated polypropylene or chlorinated ethylene/vinylacetate-copolymer.

23. Halogen-containing thermoplastic resins comprising from 0.1 to 5 parts of stabilizer according to claim 18 per 100 parts of resin.

24. Halogen-containing thermoplastic resins according to claim 23, wherein the halogen-containing thermoplastic resin is selected from the group consisting of PVC, polyvinylidene chloride, chlorinated or chlorosulphonated polyethylene, chlorinated polypropylene or chlorinated ethylene/vinylacetate-copolymer.

25. Basic layered lattice compounds of general formula (II):

$$Me^{III}_a(Me^{II}_b Me^{IV}_{(1-b/2)})_{(1-a)}(OH)_2 A^n_{a/n} \times mH_2O \qquad (II)$$

wherein $Me^{II}$ represents a divalent metal selected from the group consisting of magnesium, calcium, barium, strontium, zinc, lead$^{II}$, cadmium or a mixture thereof;

$Me^{III}$ represents a trivalent metal selected from the group consisting of aluminum, bismuth, antimony, titanium$^{III}$, iron$^{III}$ or a mixture thereof;

$Me^{IV}$ represents a tetravalent metal selected from the group consisting of titanium$^{IV}$, tin, zirconium or a mixture thereof;

$A^n$ represents an anion having a valency n and being selected from the group consisting of sulphate, sulphite sulphide, thiosulphate, hydrogen sulphate, hydrogen sulphite, hydrogen sulphide, peroxide, peroxosulphate, carbonate, hydrogen carbonate, nitrate, nitrite, phosphate, pyrophosphate, phosphite, pyrophosphite, hydrogen phosphate, hydrogen phosphite, dihydrogen phosphate, dihydrogen phosphite, halide, pseudohalide, halite halate, perhalate, $I_3^-$, permanganate, amide, azide, hydroxide, hydroxylamide, hydrazide, acetylacetonate, an anion of an organic carboxylic acid having one or more carboxylic acid groups, an anion of mono- or polyvalent phenols or a mixture thereof;

wherein 0.05<a<0.5, 0<b<1 and 0≦m<2.

26. Basic layered lattice compounds according to claim 25, wherein the divalent metal Me$^{II}$ is selected from the group consisting of Mg, Ca, Sn, Zn or a mixture thereof.

27. Basic layered lattice compounds according to claim 25, wherein the trivalent metal Me$^{III}$ is selected from the group consisting of Al, Fe or a mixture thereof.

28. Basic layered lattice compounds according to claim 25, wherein the tetravalent metal$^{IV}$ is selected from the group consisting of Ti, Zr, Sn or a mixture thereof.

29. Basic layered lattice compounds according to claim 25, wherein the anion is selected from the group consisting of carbonate, phosphite, hydroxide, maleate, fumarate, phthalate or a mixture thereof.

30. Basic layered lattice compounds according to claim 25, wherein the divalent metal Me$^{II}$ is Mg, the trivalent metal Me$^{III}$ is Al, the tetravalent metal Me$^{IV}$ is Ti and the anion is carbonate.

31. Process for the production of the basic layered lattice compounds according to claim 25, comprising reacting Me$^{II}$ as a hydroxide, oxide or a mixture thereof, Me$^{III}$ as a hydroxide, further as a mixed salt with NaOH, as well as Me$^{IV}$ as a hydroxide, oxy salt, oxide or mixtures thereof with an acid, a salt of the acid or mixtures thereof wherein the anion of the acid has the meaning given above in an aqueous medium at a pH value of 8 to 12 at temperatures from 20 to 250° C.

32. Process for the production of the basic layered lattice compounds according to claim 31, wherein the reaction is carried out at a pH value of 9 to 11 at temperatures from 60 to 180° C.

33. Process for the production of the basic layered lattice compounds according to claim 32, wherein Me$^{IV}$ is a freshly precipitated hydroxide, oxy salt, oxide or mixtures thereof.

34. Process for the production of the basic layered lattice compounds according to claim 31, wherein Me$^{IV}$ is a freshly precipitated hydroxide, oxy salt, oxide or mixtures thereof.

35. The basic layered lattice compound according to claim 25, wherein the basic layered lattice compound is used for the stabilization of halogen-containing thermoplastic resins.

36. The basic layered lattice compound according to claim 35, wherein the halogen-containing thermoplastic resin is PVC.

37. Stabilizer for halogen-containing polymers comprising a content of at least one basic layered lattice compound according to claim 25.

38. Stabilizer for halogen-containing polymers according to claim 37, wherein the halogen containing polymer is PVC.

39. Stabilizer according to claim 37, further comprising at least one co-stabilizer selected from the group consisting of metal carboxylates, 1,3-diketo compounds, organic esters of phosphorous acid, polyols and amino acid derivatives, antioxidants and epoxy compounds.

40. Process for the production of halogen-containing thermoplastic resins comprising adding a stabilizer according to claim 39 in an amount of 0.1 to 5 parts per 100 parts of resin to the halogen-containing thermoplastic resins in a molten state, thoroughly stirring and allowing to cool.

41. Process for the production of halogen-containing thermoplastic resins comprising adding a stabilizer according to claim 37 in an amount of 0.1 to 5 parts per 100 parts of resin to the halogen-containing thermoplastic resins in a molten state, thoroughly stirring and allowing to cool.

42. Halogen-containing thermoplastic resins comprising from 0.1 to 5 parts of stabilizer according to claim 37 per 100 parts of resin.

43. Halogen-containing thermoplastic resins according to claim 42, wherein the halogen-containing thermoplastic resin is selected from the group consisting of PVC, polyvinylidene chloride, chlorinated or chlorosulphonated polyethylene, chlorinated polypropylene or chlorinated ethylene/vinylacetate-copolymer.

44. Halogen-containing thermoplastic resins comprising from 0.1 to 5 parts of stabilizer according to claim 39 per 100 parts of resin.

45. Halogen-containing thermoplastic resins according to claim 44, wherein the halogen-containing thermoplastic resin is selected from the group consisting of PVC, polyvinylidene chloride, chlorinated or chlorosulphonated polyethylene, chlorinated polypropylene or chlorinated ethylene/vinylacetate-copolymer.

46. Basic layered lattice compounds of general formula (III):

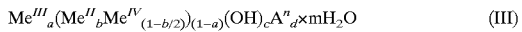

$$Me^{III}_a(Me^{II}_b Me^{IV}_{(1-b/2)})_{(1-a)}(OH)_c A^n_d \times mH_2O \qquad (III)$$

wherein

Me$^{II}$ represents a divalent metal selected from the group consisting of magnesium, calcium, barium, strontium, zinc, lead$^{II}$, cadmium or a mixture thereof;

Me$^{III}$ represents a trivalent metal selected from the group consisting of aluminum, bismuth, antimony, titanium$^{III}$, iron$^{III}$, or a mixture thereof;

Me$^{IV}$ represents a tetravalent metal selected from the group consisting of titanium$^{IV}$, tin, zirconium or a mixture thereof;

A$^n$ represents an anion having a valency n and being selected from the group consisting of sulphate, sulphite, sulphide, thiosulphate, hydrogen sulphate, hydrogen sulphite, hydrogen sulphide, peroxide peroxosulphate, carbonate hydrogen carbonate, nitrate, nitrite, phosphate, pyrophosphate, phosphite, pyrophosphite, hydrogen phosphate, hydrogen phosphite, dihydrogen phosphate, dihydrogen phosphite, halide, pseudohalide, halite, halate, perhalate, I$_3^-$, permanganate amide, azide, hydroxide, hydroxylamine, hydrazide, acetylacetonate, an anion of an organic carboxylic acid having one or more carboxylic acid groups, an anion of mono- or polyvalent phenols or a mixture thereof;

wherein 0.05<a<0.5, 0<b<1 and 0≦m<2 and c+d=2+a, with c=2 being excepted.

47. Basic layered lattice compounds according to claim 46, wherein the divalent metal Me$^{II}$ is selected from the group consisting of Mg, Ca, Sn, Zn or a mixture thereof.

48. Basic layered lattice compounds according to claim 46, wherein the trivalent metal Me$^{III}$ is selected from the group consisting of Al, Fe or a mixture thereof.

49. Basic layered lattice compounds according to claim 46, wherein the tetravalent metal$^{IV}$ is selected from the group consisting of Ti, Zr, Sn or a mixture thereof.

50. Basic layered lattice compounds according to claim 46, wherein the anion is selected from the group consisting of carbonate, phosphite, hydroxide, maleate, fumarate, phthalate or a mixture thereof.

51. Basic layered lattice compounds according to claim 46, wherein the divalent metal Me$^{II}$ is Mg, the trivalent metal Me$^{III}$ is Al, the tetravalent metal Me$^{IV}$ is Ti and the anion is carbonate.

52. Process for the production of the basic layered lattice compounds according to claim 46, comprising reacting Me$^{II}$ as a hydroxide, oxide or a mixture thereof, Me$^{III}$ as a hydroxide, further as a mixed salt with NaOH, as well as $Me^{IV}$ as a hydroxide, oxy salt, oxide or mixtures thereof with an acid, a salt of the acid or mixtures thereof wherein the anion of the acid has the meaning given above in an aqueous medium at a pH value of 8 to 12 at temperatures from 20 to 250° C.

53. Process for the production of the basic layered lattice compounds according to claim 52, wherein the reaction is carried out at a pH value of 9 to 11 at temperatures from 60 to 180° C.

54. Process for the production of the basic layered lattice compounds according to claim 53, wherein $Me^{IV}$ is a freshly precipitated hydroxide, oxy salt, oxide or mixtures thereof.

55. Process for the production of the basic layered lattice compounds according to claim 52, wherein $Me^{IV}$ is a freshly precipitated hydroxide, oxy salt, oxide or mixtures thereof.

56. The basic layered lattice compound according to claim 46, wherein the basic layered lattice compound is used for the stabilization of halogen-containing thermoplastic resins.

57. The basic layered lattice compound according to claim 56, wherein the halogen-containing thermoplastic resin is PVC.

58. Stabilizer for halogen-containing polymers comprising a content of at least one basic layered lattice compound according to claim 46.

59. Stabilizer for halogen-containing polymers according to claim 58, wherein the halogen containing polymer is PVC.

60. Stabilizer according to claim 58, further comprising at least one co-stabilizer selected from the group consisting of metal carboxylates, 1,3-diketo compounds, organic esters of phosphorous acid, polyols and amino acid derivatives, antioxidants and epoxy compounds.

61. Process for the production of halogen-containing thermoplastic resins comprising adding a stabilizer according to claim 60 in an amount of 0.1 to 5 parts per 100 parts of resin to the halogen-containing thermoplastic resins in a molten state, thoroughly stirring and allowing to cool.

62. Process for the production of halogen-containing thermoplastic resins comprising adding a stabilizer according to claim 58 in an amount of 0.1 to 5 parts per 100 parts of resin to the halogen-containing thermoplastic resins in a molten state, thoroughly stirring and allowing to cool.

63. Halogen-containing thermoplastic resins comprising from 0.1 to 5 parts of stabilizer according to claim 58 per 100 parts of resin.

64. Halogen-containing thermoplastic resins according to claim 63, wherein the halogen-containing thermoplastic resin is selected from the group consisting of PVC, polyvinylidene chloride, chlorinated or chlorosulphonated polyethylene, chlorinated polypropylene or chlorinated ethylene/vinylacetate-copolymer.

65. Halogen-containing thermoplastic resins comprising from 0.1 to 5 parts of stabilizer according to claim 60 per 100 parts of resin.

66. Halogen-containing thermoplastic resins according to claim 65, wherein the halogen-containing thermoplastic resin is selected from the group consisting of PVC, polyvinylidene chloride, chlorinated or chlorosulphonated polyethylene, chlorinated polypropylene or chlorinated ethylene/vinylacetate-copolymer.

\* \* \* \* \*

UNITED STATES PATENT AND TRADEMARK OFFICE
CERTIFICATE OF CORRECTION

PATENT NO. : 5,972,245
DATED : October 26, 1999
INVENTOR(S) : Michael Schiller, et. al.

It is certified that error appears in the above-identified patent and that said Letters Patent is hereby corrected as shown below:

Title page, item [75], inventor, delete "karoline" and insert therefor, --Karoline--.

In column 20, claim 19, in line 14, delete "16" and insert therefor, --18--.

In column 22, claim 46:
    in line 34, after "peroxide" insert --,--;
    in line 35, after "carbonate" insert --,--;
    in line 40, before "amide" insert --,--.

Signed and Sealed this

Twelfth Day of September, 2000

Q. TODD DICKINSON

*Attest:*

*Attesting Officer*  *Director of Patents and Trademarks*